United States Patent
Sauma Vargas et al.

(10) Patent No.: US 10,091,205 B2
(45) Date of Patent: Oct. 2, 2018

(54) ZEROCONF PROFILE TRANSFERRING TO ENABLE FAST ROAMING

(71) Applicant: HEWLETT PACKARD ENTERPRISE DEVELOPMENT LP, Houston, TX (US)

(72) Inventors: Jorge Arturo Sauma Vargas, San Jose (CR); Jocelyn Le Sage, Québec (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 213 days.

(21) Appl. No.: 14/914,754

(22) PCT Filed: Aug. 30, 2013

(86) PCT No.: PCT/US2013/057735
§ 371 (c)(1),
(2) Date: Feb. 26, 2016

(87) PCT Pub. No.: WO2015/030827
PCT Pub. Date: Mar. 5, 2015

(65) Prior Publication Data
US 2016/0212140 A1    Jul. 21, 2016

(51) Int. Cl.
*H04L 29/06* (2006.01)
*H04W 12/06* (2009.01)
(Continued)

(52) U.S. Cl.
CPC ............ *H04L 63/102* (2013.01); *H04L 63/06* (2013.01); *H04L 63/08* (2013.01);
(Continued)

(58) Field of Classification Search
CPC ..... H04W 84/12; H04W 12/08; H04W 12/06; H04L 67/16; H04L 2012/2841
See application file for complete search history.

(56) References Cited

U.S. PATENT DOCUMENTS 7,103,359 B1    9/2006  Heinonen et al.
8,424,070 B1    4/2013  Reeves et al.
(Continued)

FOREIGN PATENT DOCUMENTS

CN    101142790    3/2008
CN    101212371    7/2008
(Continued)

OTHER PUBLICATIONS

Cisco, Configuring WDS, Fast Secure Roaming, and Radio Management, 12 Pages (Year: 2007).*

(Continued)

*Primary Examiner* — Farid Homayounmehr
*Assistant Examiner* — Christopher C Harris
(74) *Attorney, Agent, or Firm* — Hewlett Packard Enterprise Patent Department (57) ABSTRACT

Example embodiments relate to zeroconf profile transferring to enable fast roaming. In example embodiments, user identification is received from a user computing device that is connected to a wireless device, where the user identification is sent to an authentication server to determine a zeroconf profile name. In response to receiving a user authorization from the authentication server, the user computing device is provided with access to a network. Further, a zeroconf profile is used to provide the user computing device with access to services on the network, where the zeroconf profile is identified using the profile name. The zeroconf profile name is then sent to a neighboring wireless device that uses the zeroconf profile name to identify the zeroconf profile for providing the user computing device with access to the services.

10 Claims, 5 Drawing Sheets

(51) Int. Cl.
*H04W 8/12* (2009.01)
*H04W 8/20* (2009.01)

(52) U.S. Cl.
CPC ........... *H04L 63/0884* (2013.01); *H04W 8/12* (2013.01); *H04W 8/20* (2013.01); *H04W 12/06* (2013.01)

(56) References Cited

U.S. PATENT DOCUMENTS

| | | | |
|---|---|---|---|
| 2002/0035699 | A1 | 3/2002 | Crosbie |
| 2002/0176366 | A1* | 11/2002 | Ayyagari ................ H04L 63/08 370/245 |
| 2003/0169713 | A1 | 9/2003 | Luo |
| 2005/0143065 | A1 | 6/2005 | Pathan et al. |
| 2006/0256763 | A1 | 11/2006 | Nguyen et al. |
| 2008/0119184 | A1* | 5/2008 | Rebo .................. H04L 63/0869 455/433 |
| 2008/0235770 | A1 | 9/2008 | Miao |
| 2008/0294759 | A1* | 11/2008 | Biswas ............... H04L 29/1232 709/222 |
| 2010/0309878 | A1 | 12/2010 | Stolyar et al. |
| 2012/0204236 | A1 | 8/2012 | Chen et al. |
| 2014/0359148 | A1* | 12/2014 | Cherian .................. H04L 41/28 709/229 |
| 2014/0376408 | A1* | 12/2014 | Lakshminarayana Atreya ............ H04L 41/0809 370/255 |

FOREIGN PATENT DOCUMENTS

| | | |
|---|---|---|
| CN | 101300877 | 11/2008 |
| CN | 101390408 | 3/2009 |
| CN | 102014391 | 4/2011 |
| CN | 102369762 | 3/2012 |
| EP | 1429522 B1 | 8/2008 |
| JP | 2006-340380 A | 12/2006 |
| WO | WO-2006058128 | 6/2006 |

OTHER PUBLICATIONS

"The Intelligent Wireless Networking Choice," Jun. 16, 2005, pp. 1-4, Colubris Networks, Inc.

International Search Report, International Application No. PCT/US2013/057735, dated May 27, 2014, pp. 1-3.

V. Sharma, "What is CCKM, and How Does It Affect Fast and Secure Roaming?," Jun. 18, 2009, pp. 1-5, Cisco Systems, Inc.

* cited by examiner

ZEROCONF PROFILE TRANSFERRING TO ENABLE FAST ROAMING

BACKGROUND

A zero-configuration (zeroconf) filtering mechanism may be used to create a network based on the internet protocol suite (TCP/IP) for interconnected computing devices or peripherals. A zeroconf profile includes a set of filtering rules for specifying whether a packet is allowed in the network and/or for modifying the packet as it is routed. The zeroconf profile is stored in a central place (e.g., a controller for wireless devices) and can be applied when a specific condition is satisfied such as when associating with a specific wireless local area network (WLAN) or access point or when a specific user is associated with the network.

BRIEF DESCRIPTION OF THE DRAWINGS

The following detailed description references the drawings, wherein.

DETAILED DESCRIPTION

As discussed above, zeroconf protocols allow for networks to be created between interconnected devices and peripherals without manual configuration. When a specific user is associated with a network, the zeroconf profile's name can be stored in an authentication server and retrieved when a specific credential is used to connect to the network. As part of the policies and configuration parameters managed by an authentication server, the authentication server can provide a zeroconf profile's name that should be applied to the user. A wireless device such as an access point (AP) will identify the filtering profile using the profile's name provided by the authentication server and apply it to the user. A zeroconf profile is a set of filtering rules for defining if a packet is allowed in the network and/or for modifying the packet as it is routed.

When a user roams from one AP to another, the second AP does not know the name of the profile that should be applied to the user device; thus, the second AP sends another request for the name to the authentication server. This second request can delay the roaming process and even tear down the association with the user device. In some cases, fast roaming mechanisms can be used to exchange association and authentication information between APs in order to avoid a client re-authentication and to provide seamless roaming between devices. Example implementations disclosed herein apply a fast roaming mechanism (e.g., opportunistic key caching, centralized caching, etc.) to zeroconf filtering profiles in order to exchange the profiles' names between APs thereby avoiding resending a request for a profile's name of a user to the authentication server. In this case, roaming between AP's can be seamless because the second AP has all the information needed to maintain the association's attributes as with the first AP.

Example embodiments disclosed herein provide zeroconf profile transferring to enable fast roaming. For example, in some embodiments, user identification is received from a user computing device that is connected to a wireless device (e.g., access point), where the user identification is sent to an authentication server to determine a zeroconf profile name. In response to receiving a user authorization from the authentication server, the user computing device is provided with access to a network. Further, a zeroconf profile is used to provide the user computing device with access to services on the network, where the zeroconf profile is identified using the profile name. Next, the zeroconf profile name is sent to a neighboring wireless device (e.g., neighboring access point) that uses the zeroconf profile name to identify the zeroconf profile for providing the user computing device with access to the services. In this manner, example embodiments disclosed herein allow for fast roaming by transferring zeroconf profiles between wireless devices (e.g., access points).

Figure 1:
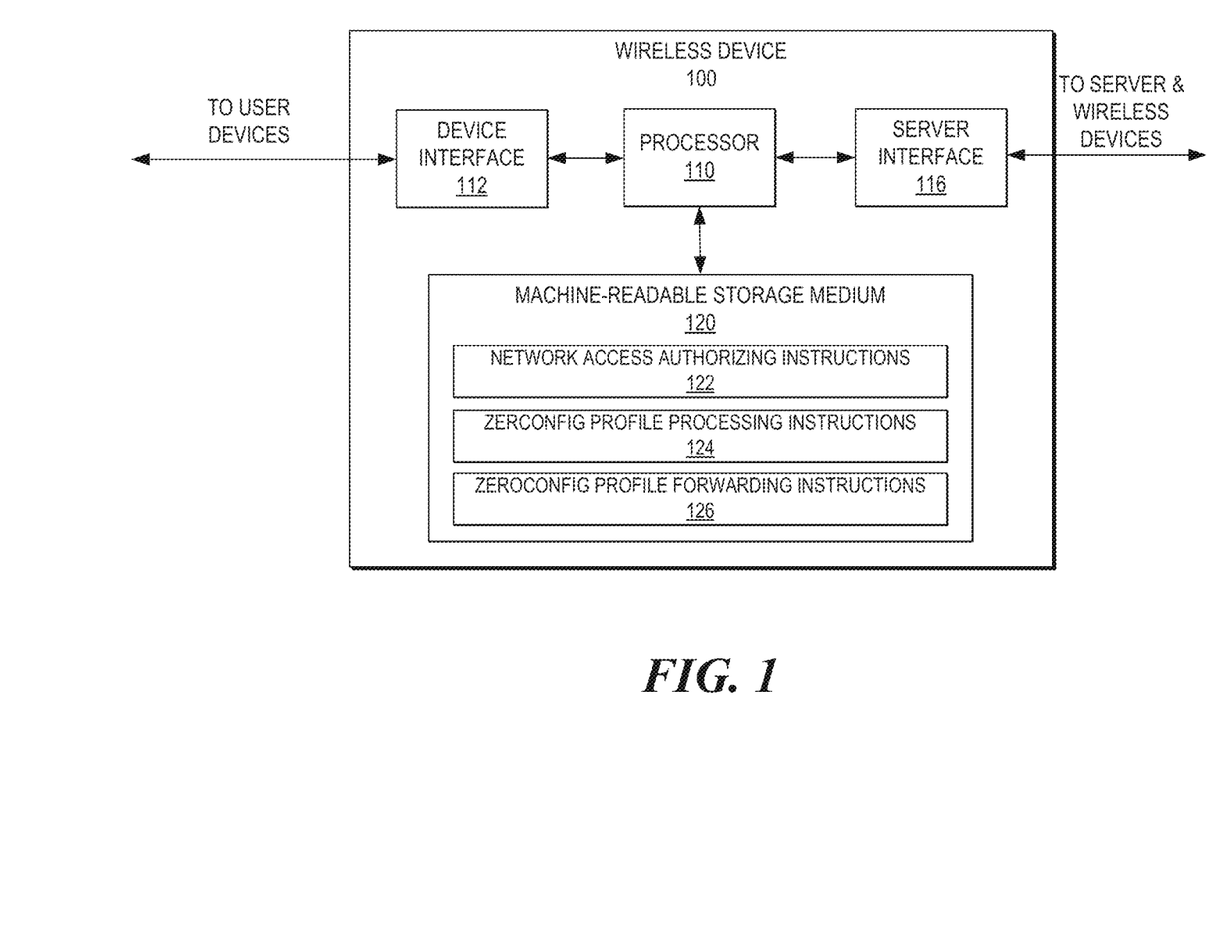
FIG. 1 is a block diagram of an example wireless device for zeroconf profile transferring to enable fast roaming.

Referring now to the drawings, FIG. 1 is a block diagram of an example wireless device 100 for zeroconf profile transferring to enable fast roaming. The example wireless device 100 may be implemented as an access point, wireless array, or any other electronic device suitable for zeroconf profile transferring to enable fast roaming. In the embodiment of FIG. 1, wireless device 100 includes processor 110, device interface 112, server interface 116, and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126 to enable zeroconf profile transferring to enable fast roaming, as described below. As an alternative or in addition to retrieving and executing instructions, processor 110 may include one or more electronic circuits comprising a number of electronic components for performing the functionality of one or more of instructions 122, 124, 126.

Device interface 112 may include a number of electronic components for communicating with user devices and other wireless devices. For example, device interface 112 may be a wireless interface, such as a wireless local area network (WLAN) interface or a near-field communication (NFC) interface. In operation, as detailed below, device interface 112 may be used to send and receive data, such as user data and profile data, to and from corresponding interfaces of user devices. User devices may be computing devices that are wirelessly connected to wireless device 100 such as desktop computers, tablets, smartphones, laptop computers, or any other computing devices suitable for accessing a network through wireless device 100.

Server interface 116 may include a number of electronic components for communicating with server devices. For example, server interface 116 may be an Ethernet interface, a Universal Serial Bus (USB) interface, an IEEE 1394 (Firewire) interface, an external Serial Advanced Technology Attachment (eSATA) interface, or any other physical connection interface suitable for communication with the server devices and neighboring wireless devices. In another example, server interface 116 may be a wireless interface. In this example, device interface 112 and server interface 116 may be combined into a single wireless interface. In operation, as detailed below, server interface 116 may be used to send and receive data, such as user data and profile data, to and from a server device.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), flash memory, a storage drive, an optical disc, and the like. As described in detail below, machine-readable storage medium 120 may be encoded with executable instructions for zeroconf profile transferring to enable fast roaming.

Network access authorizing instructions 122 may manage access of user devices to a network. Specifically, user identifications provided by users of user devices may be received and then used to determine whether the user devices should be authorized to access the network. For example, an authentication server may be used via server interface 116 to determine if the user is authorized. In this example, network access authorizing instructions 122 may receive user credentials from a user device and then forward the user credentials to the authentication server, which determines whether the user device is authorized to access the network. In another example, the user identification may be provided to a controller of the wireless device, where the controller interacts with the authentication server to obtain the user authorization.

Zeroconf profile processing instructions 124 may use zeroconf profiles to manage services for user devices. Initially, a profile's name may be obtained from an authentication server, which may identify the profile's name based on the user identification. After the profile's name is received, the corresponding zeroconf profile may be used to determine the services that the related user device should be authorized to access or discover and/or to modify packets routed through the wireless device. The zeroconf profile defines a set of filtering rules for specifying whether a packet is allowed on the network. For example, a multicast domain name system (mDNS) may be provided, where each interconnected user device and peripheral maintains its own list of DNS resource records and joins the mDNS group. In this example, a device or peripheral may send a request to a known multicast address to discover the IP address of a target device or peripheral, where the target device or peripheral may then reply with its IP address.

Zeroconf profile forwarding instructions 126 may forward zeroconf profiles' names to neighboring wireless devices. Specifically, as a user device transitions from being connected to wireless device 100 to a neighboring wireless device (i.e., roaming), the profile's name associated with the user device may be forwarded to the neighboring wireless device. In this case, the user identification associated with the user device may also be forwarded to the neighboring wireless adapter. In some cases, profile's name may be provided to the neighboring wireless device by a controller (not shown) that is associated with the wireless device 100 and the neighboring wireless device. After the neighboring wireless adapter receives the profile's name and user identification, the neighboring wireless device may authorize the user device to access or discover services while bypassing the authentication server (i.e., fast roaming).

Fast roaming may be performed as a user device moves its active connection between wireless devices (e.g., wireless device 100) that support key caching such as opportunistic key caching or centralized caching. Opportunistic key caching allows for fast roaming between wireless devices that have a common controller. For opportunistic key caching, the user authorization and the zeroconf profile's name may be stored by the controller and preemptively provided to wireless devices as the user device roams. Centralized caching may be available in environments configured with wireless domain services (WDS). For centralized caching, one of the wireless devices may provide the WDS and provide the user authorization and the zeroconf profile's name directly to other wireless devices in the network.

Figure 2A:
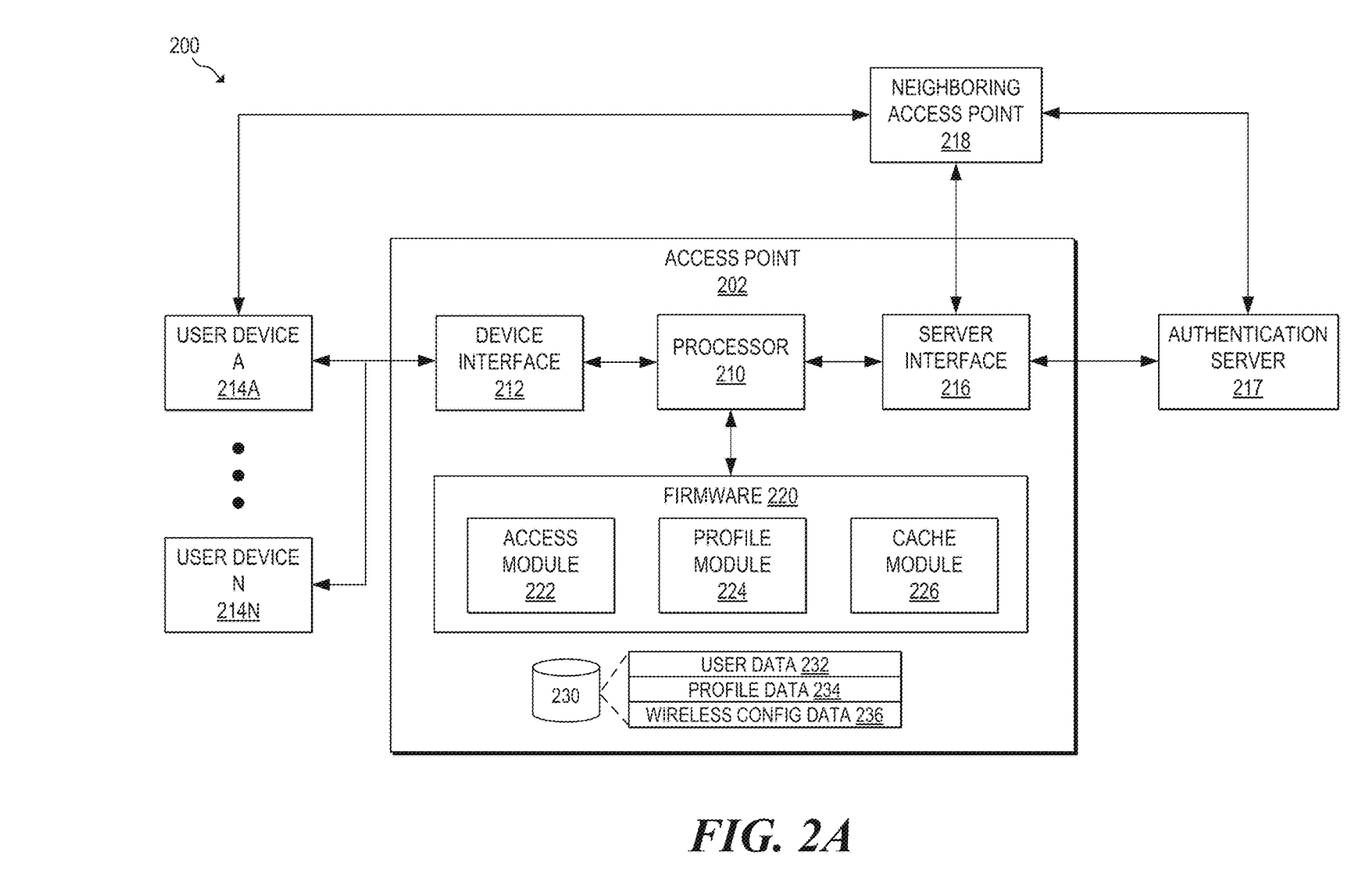
FIG. 2A is a block diagram of an example system for zeroconf profile transferring to enable fast roaming.

FIG. 2A is a block diagram of an example system 200 including access points (e.g., access point 202, neighboring access point 218) that allow for fast roaming of user devices (e.g., user device A 214A, user device N 214N). The components of the access points may be similar to the corresponding components of wireless device 100 described with respect to FIG. 1. System 200 includes user devices (e.g., user device A 214A, user device N 214N), access point 202, neighboring access point 218, and authentication server 217.

As illustrated, access point 202 may include processor 210, device interface 212, server interface 216, firmware 220, and storage device 230. Processor 210, device interface 212, and server interface 216 may be similar to the corresponding components of wireless device 100 that are described above with respect to FIG. 1. In this example, device interface 212 communicates with user devices (e.g., user device A 214A, user device N 214N), and server interface 216 communicates with authentication server 217 neighboring access point 218. Firmware 220 may include a number of modules 222-226, where each of the modules may include a series of instructions encoded on a machine-readable storage medium, which may be similar to machine-readable storage medium 120 of FIG. 1, and executable by processor 210. In addition or as an alternative, each module may include one or more hardware devices including electronic circuitry for implementing the functionality described below. Although the components of firmware 220 are described in detail below, additional details regarding an example implementation of firmware 220 are provided above in connection with instructions 122-126 of FIG. 1.

Access module 222 may manage network access for user devices (e.g., user device A 214A, user device N 214N). Specifically, access module 222 may collect user identifications from the user devices (e.g., user device A 214A, user device N 214N) and authenticate the user identifications with the authentication server 217. If a user device (e.g., user device A 214A, user device N 214N) is authorized to access the network, access module 222 may facilitate the user device's access to the network. User identifications may be stored in data storage 230 as user data 232.

Profile module 224 may manage zeroconf profiles for user devices (e.g., user device A 214A, user device N 214N). Specifically, profile module 224 may filter packets from user devices (e.g., user device A 214A, user device N 214N) based on the services the user devices are authorized to access or discover according to their corresponding zeroconf profiles. Profile module 224 may identify the zeroconf profile for a user device (e.g., user device A 214A, user device N 214N) based on the profile's name received from the authentication server 217, which determines the profile's name based on the user identification associated with the user device. Zeroconf profiles may be stored in data storage 230 as profile data.

Cache module 226 may interact with neighboring access point 218 to enable fast roaming of the user devices (e.g., user device A 214A, user device N 214N) between access point 202 and neighboring access point 218. For example, cache module 226 may provide user identification and a profile's name for a user device (e.g., user device A 214A, user device N 214N) to neighboring access point 218 as the user device transitions its connection from access point 202 to neighboring access point 218. In this example, fast roaming is enabled on neighboring access point 218 because neighboring access point 218 can bypass authentication server 217 when authorizing the user device (e.g., user device A 214A, user device N 214N). Further, cache module 226 may be responsible for receiving user identifications and profiles' names for user devices (e.g., user device A 214A, user device N 214N) from neighboring access point 218 as the user devices transition their connection to access point 202. Various configurations (e.g., information describing neighboring access point 218, user parameters that are designated for caching, etc.) of cache module 226 for enabling fast roaming may be stored in data storage 230 as wireless configuration data 236.

Storage device 230 may be any hardware storage device for maintaining data accessible to access point 202. For example, storage device 230 may include one or more flash drives, solid state drives, memory, and/or any other suitable storage devices. As detailed above, storage device 230 may maintain user data 232, profile data 234, and wireless configuration data 236. Alternatively, storage device 230 may be a database provided by an external device (not shown).

User devices (e.g., user device A 214A, user device N 214N) may be computing devices that are wirelessly connected to access point 202. Each user device (e.g., user device A 214A, user device N 214N) may be, for example, a desktop computer, a tablet, a smartphone, a laptop computer, or any other computing device suitable for accessing a network through access point 202.

Authentication server 217 may be any server accessible to access point 202 over the network that is suitable for authorizing user identifications for access to the network. Neighboring access point 218 may be similar to access point 202 as described above.

Figure 2B:
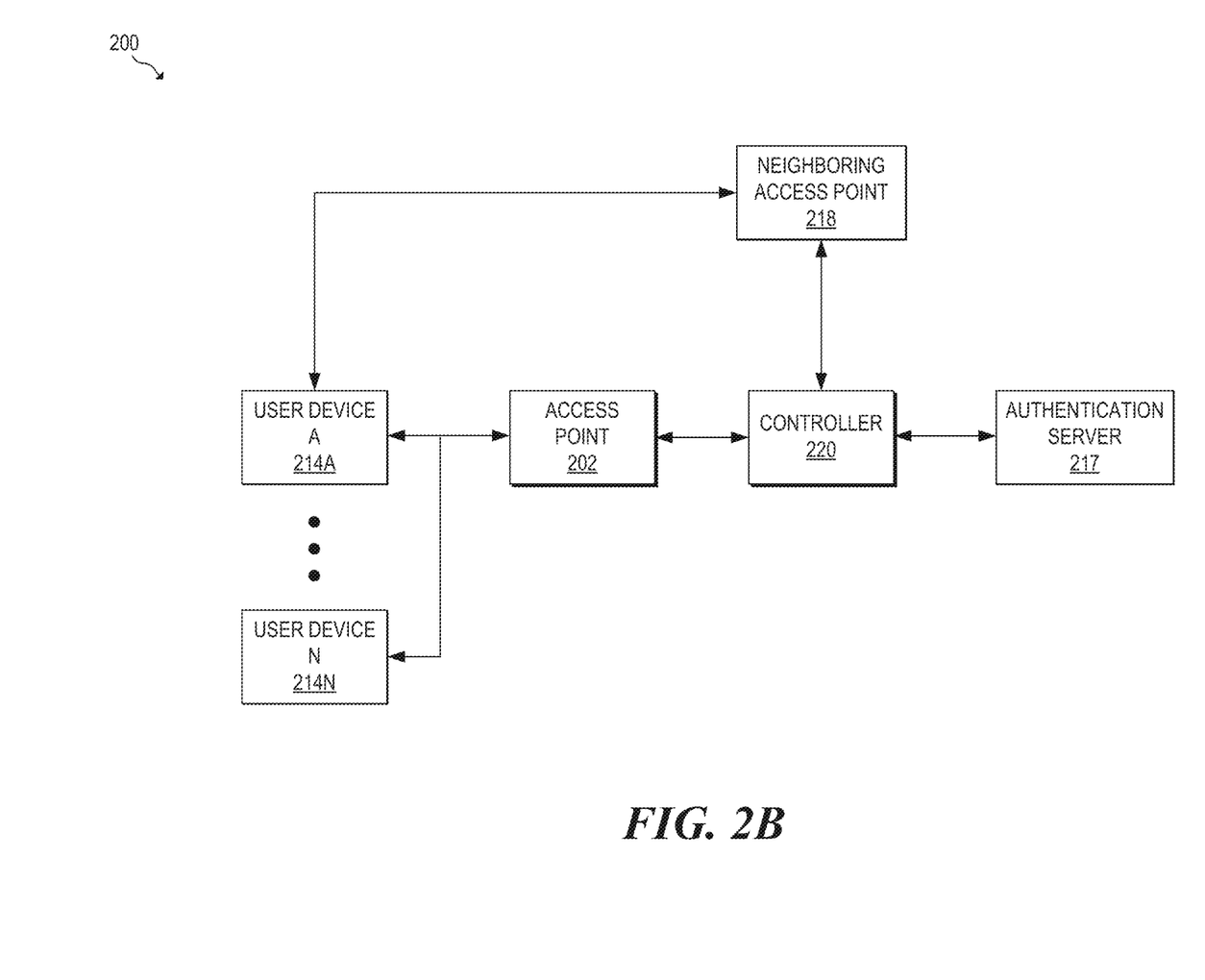
FIG. 2B is a block diagram of an example system including a controller for zeroconf profile transferring to enable fast roaming.
Figure 3:
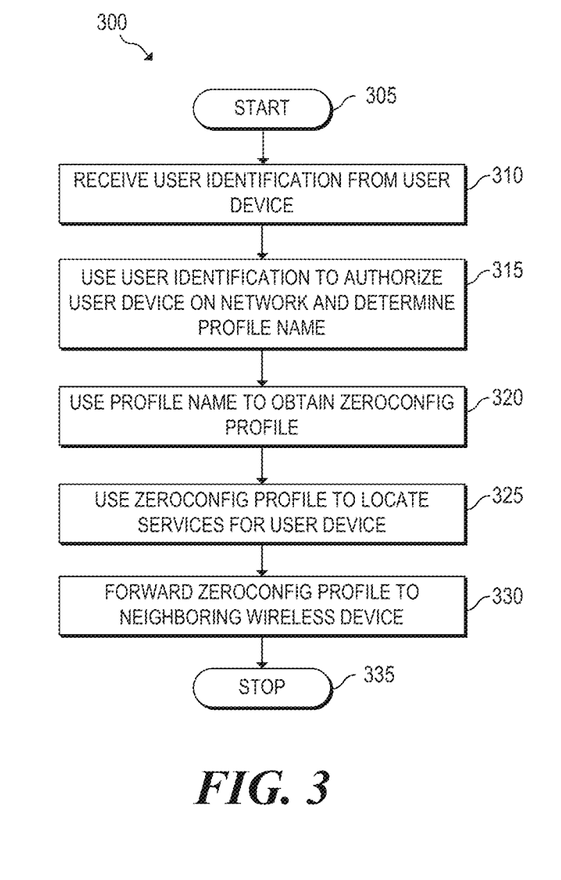
FIG. 3 is a flowchart of an example method for execution a wireless device for zeroconf profile transferring to enable fast roaming.

FIG. 3 is a flowchart of an example method 300 for execution by a wireless device 100 for zeroconf profile transferring to enable fast roaming. Although execution of method 300 is described below with reference to wireless device 100 of FIG. 1, other suitable devices for execution of method 300 may be used, such as access point 202 of FIGS. 2A and 2B. Method 300 may be implemented in the form of executable instructions stored on a machine-readable storage medium, such as computer readable medium 120 of FIG. 1, and/or in the form of electronic circuitry.

FIG. 2B is a block diagram of an example system 200 including access points (e.g., access point 202, neighboring access point 218) that allow for fast roaming of user devices (e.g., user device A 214A, user device N 214N). System 200 includes user devices (e.g., user device A 214A, user device N 214N), access point 202, neighboring access point 218, authentication server 217, and controller 220. Except as described below with respect to controller 220, the components of system 200 may be similar to the corresponding components described above with respect to FIG. 2A.

In FIG. 2B, access point 202 and neighboring access point 218 are connected to controller 220, which is connected to authentication server 217. Controller 218 may be a computing device such as a wireless local area network (WLAN) controller that is configured to manage access points (e.g., access point 202, neighboring access point 218). In this example, controller 220 manages communications between the access points (e.g., access point 202, neighboring access point 218) and authentication server 217. Controller 220 may include an interface for connecting to access points (e.g., access point 202, neighboring access point 218) and authentication server 217 and a processor for performing the functionality described below. For example, controller 220 may be configured with firmware with a profile module and a cache module that are similar to those of access point 202 as described above with respect to FIG. 2A.

Controller 220 may perform automatic configurations of access points (e.g., access point 202, neighboring access point 218) such as radio frequency (RF) power, channels, authentication, and security. For example, controller 220 may be responsible for providing the user identification and the zeroconf profile's name to neighboring access point 218 as a user device (e.g., user device A 214A, user device N 214N) roams from access point 202 to neighboring access point 218. In this example, controller 220 may monitor the user device's signal strength with access point 202 and neighboring access point 218 to determine when the user identification and the zeroconf profile's name should be provided to neighboring access point 218.

Method 300 may start in block 305 and continue to block 310, where wireless device 100 may receive user identification from a user device. For example, the user identification may be user credentials for logging into a network. In block 315, the user identification is used to authorize the user device on the network and determine a zeroconf profile's name that is associated with the user device. Wireless device 100 may interact with an authentication server to authorize the user device and obtain the profile's name.

In block 320, the profile's name is used to obtain a zeroconf profile. Wireless device 100 may be preconfigured with zeroconf profiles, which may be searched to identify the zeroconf profile corresponding to the profile's name. In block 325, the zeroconf profile is used to locate services on the network that the user device is authorized to access or discover. Services may include media content, shared files or directories, databases, distributed applications, etc.

In block 330, the zeroconf profile's name is forwarded to a neighboring wireless device. The zeroconf profile's name may be forwarded by an access point or by a controller of the access point. Specifically, the zeroconf profile's name may be forwarded as the user device is transitioning its wireless connection to the neighboring wireless device. For example, the zeroconf profile's name may be forwarded based on the user device's signal strength with the wireless device and the neighboring wireless device. In this example, when the signal strength with the neighboring wireless device begins to surpass the signal strength with the wireless device, the zeroconf profile's name may be forwarded to the neighboring wireless device in anticipation of the user device roaming to the neighboring wireless device. A user authorization that was obtained from the authentication server may also be forwarded to the neighboring wireless device. Because the neighboring wireless device has the user authorization and the zeroconf profile's name, fast roaming may be enabled such that the neighboring wireless device is able to grant the user device access to the network and the services while bypassing the authorization server.

Figure 4:
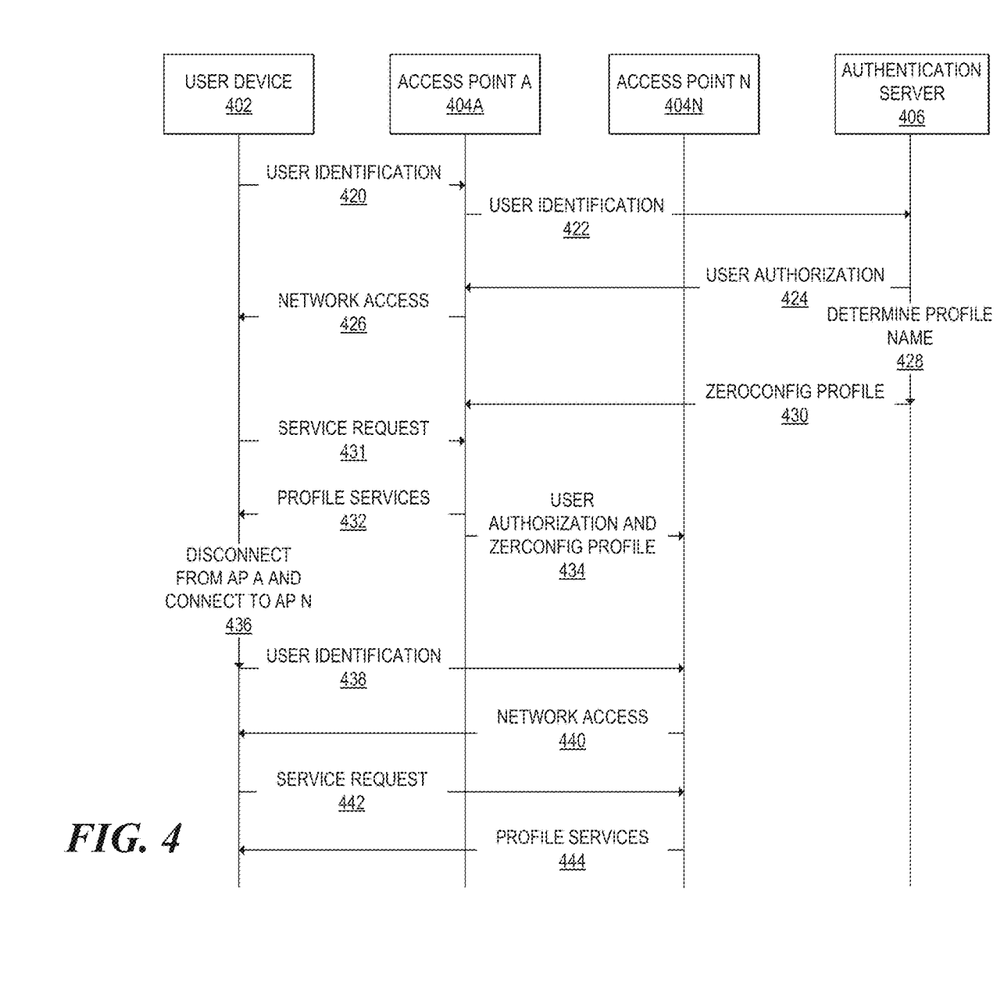
FIG. 4 is a workflow diagram showing an example network for zeroconf profile transferring to enable fast roaming.

FIG. 4 is a workflow diagram 400 showing zeroconf profile transferring to enable fast roaming on an example network. Workflow diagram 400 shows a user device 402, an access point A 404A, an access point N 404N, and an authentication server 406, which may each be similar to their corresponding components described above with respect to FIGS. 1 and 2.

In block 420, user device 402 provides user identification to access point A 404A. Access point A may then forward the user identification to authentication server 406 in block 422. At this stage, authentication server 406 may process the user identification (e.g., verify user credentials) to determine if user device 402 is authorized to access a network. In block 424, authentication server 406 provides user authorization to access point A 404A. After access point A 404A has received the user authorization, access point A 404A may provide access to the network to user device 402 in block 426.

Authentication server 406 also uses the user identification to determine a zeroconf profile's name in block 428. Each user device (e.g., user device 402) that is authorized to access the network is associated with a zeroconf profile as specified in a lookup table. In block 430, authentication server 406 provides the zeroconf profile's name to access point A 404A. Access point A 404 may then use the profile's name to identify the zeroconf profile, which is then used to determine which services user device 402 is authorized to access or discover.

In block 431, user device 402 sends a service request to access point A 404A. In response to the service request, access point A 404A may provide services to user device 402 according to the zeroconf profile in block 432. In block 434, access point A 404A provides the user authorization and the zeroconf profile's name to access point N 404N, a neighboring access point that may be configured in a wireless mobility group with access point A 404A. For example, the user authorization and the zeroconf profile's name may be sent to access point N 404N as user device 402 transitions its connection to access point N 404N in the wireless mobility group. In this example, the zeroconf profile's name may be provided based on user device's 402 signal strength with access point A 404A and access point N 404N (e.g., when the signal strength with access point N 404N is close to or surpasses the signal strength with access point A 404A). In another example, the user authorization and the zeroconf profile's name may be provided to access point N 404N by a controller (not shown) of access point A 404A and access point N 404N. Access point A 404A may have any number of neighboring access points, where the user authorization and the zeroconf profile's name may be provided as described above to each of the neighboring access points.

A wireless mobility group may be a group of WLAN controllers and their associated access points (e.g., access point A 404A, access point N 404N) in a network. Devices in a wireless mobility group may share context and state (e.g., user authorizations, zeroconf profiles' names) of user devices (e.g., user device 402).

In block 436, user device 402 disconnects from access point A 404A and connects to access point N 404N. Next, user device 402 provides the user identification to access point N 404N in block 438. Because access point N 404N has already received the user authorization for user device 402 from access point A 404A, access point N 404N may provide user device 402 with access to the network while bypassing the authentication server 406 in block 440. In block 442, user device 402 sends a service request to access point N 404N. In response to the service request, access point N 404N may provide services to user device 402 according to the zeroconf profile in block 444. Again, because access point N 404N has already received the zeroconf profile's name from access point A 404A, access point N 404N may provide user device 402 with access to the services while bypassing the authentication server 406.

The foregoing disclosure describes a number of example embodiments for zeroconf profile transferring to enable fast roaming. In this manner, the embodiments disclosed herein facilitate fast roaming by transferring a zeroconf profile directly between access points so that the authentication server may be bypassed when a user device is roaming.

We claim:

1. A method for transferring zeroconf profiles between wireless devices to enable fast roaming, comprising:
   receiving user identification from a user computing device that is connected to a wireless device, wherein the user identification is sent to an authentication server to determine a zeroconf profile name;
   in response to receiving a user authorization from the authentication server, providing the user computing device with access to a network;
   using a zeroconf profile to provide the user computing device with access to services on the network, wherein the zeroconf profile is identified using the zeroconf profile name;
   in response to determining that the user computing device is roaming from the wireless device to a neighboring wireless device, sending the zeroconf profile name to the neighboring wireless device;
   identifying, by the neighboring wireless device, the zeroconf profile by the zeroconf profile name to provide the user computing device with access to the services, wherein the neighboring wireless device bypasses the authentication server when locating the services that the user computing device is authorized to access.

2. The method of claim 1, wherein the neighboring wireless device is an access point, and wherein the zeroconf profile is sent to the neighboring wireless device in response to a first signal strength of the user computing device with the wireless device being surpassed by a second signal strength of the user computing device with the neighboring wireless device.

3. The method of claim 1, wherein the services comprise media content of media content providers.

4. The method of claim 1, wherein the zeroconf profile is sent to the neighboring wireless device using key caching to thereby bypass the authentication server.

5. The method of claim 1, wherein the zeroconf profile name is sent to the neighboring wireless device as the user computing device transitions to the neighboring wireless device in a wireless mobility group.

6. A system for transferring zeroconf profiles, comprising a wireless device and a neighboring wireless device, the wireless device comprising a processor and a machine-readable storage medium storing instructions executable by the processor to:
   receive user identification from a user computing device;
   send the user identification to an authentication server, wherein the authentication server uses the user identification to identify a zeroconf profile name; and
   use the zeroconf profile name to identify a zeroconf profile for providing the user computing device with access to services; and
   in response to determining that the user computing device is roaming from the wireless device to a neighboring wireless device, sending the zeroconf profile name to the neighboring wireless device, the neighboring wireless device to:
   identify the zeroconf profile by the zeroconf profile name to provide the user computing device with access to the services, wherein the neighboring wireless device bypasses the authentication server when locating the services that the user computing device is authorized to access.

7. The system of claim 6, wherein the neighboring wireless device is an access point, and wherein the zeroconf profile is sent to the neighboring wireless device in response to determining that a first signal strength of the user computing device with the wireless device surpasses a second signal strength of the user computing device with the neighboring wireless device.

8. The system of claim 6, wherein the services comprise media content of media content providers.

9. The system of claim 6, wherein the zeroconf profile is sent to the neighboring wireless device using key caching to thereby bypass the authentication server.

10. The system of claim 6, wherein the zeroconf profile name is sent to the neighboring wireless device as the user computing device transitions to the neighboring wireless device in a wireless mobility group.

* * * * *